(12) United States Patent
Muhlestein et al.

(10) Patent No.: US 10,558,375 B2
(45) Date of Patent: Feb. 11, 2020

(54) STORAGE LEVEL ACCESS CONTROL FOR DATA GROUPING STRUCTURES

(71) Applicant: NetApp Inc., Sunnyvale, CA (US)

(72) Inventors: Mark Muhlestein, Sunnyvale, CA (US); Amit Aggarwal, Mathura (IN); Amrutha Ks, Chintamani (IN)

(73) Assignee: NetApp, Inc., Sunnyvale, CA (US)

( * ) Notice: Subject to any disclaimer, the term of this patent is extended or adjusted under 35 U.S.C. 154(b) by 877 days.

(21) Appl. No.: 14/550,276

(22) Filed: Nov. 21, 2014

(65) Prior Publication Data

US 2016/0139845 A1 May 19, 2016

(30) Foreign Application Priority Data

Nov. 13, 2014 (IN) .......................... 5710/CHE/2014

(51) Int. Cl.
*G06F 3/06* (2006.01)

(52) U.S. Cl.
CPC .......... *G06F 3/0622* (2013.01); *G06F 3/0637* (2013.01); *G06F 3/0673* (2013.01)

(58) Field of Classification Search
CPC .... G06F 3/0622; G06F 3/0637; G06F 3/0673; G06F 2009/45583
See application file for complete search history.

(56) References Cited

U.S. PATENT DOCUMENTS

| | | | | |
|---|---|---|---|---|
| 5,948,062 A * | 9/1999 | Tzelnic | ............... | G06F 11/1435 709/219 |
| 6,295,575 B1 * | 9/2001 | Blumenau | ............. | G06F 3/0622 711/153 |
| 8,078,816 B1 * | 12/2011 | Thoppai | ............ | G06F 17/30215 711/162 |
| 9,430,483 B1 * | 8/2016 | Cowan | ................... | G06F 17/302 |
| 2002/0129246 A1 * | 9/2002 | Blumenau | ............. | G06F 21/602 713/168 |
| 2006/0218256 A1 * | 9/2006 | Maruyama | ............ | G06F 3/0605 709/220 |
| 2008/0055617 A1 * | 3/2008 | Savagaonkar | ...... | G06F 12/1458 358/1.9 |
| 2011/0231573 A1 * | 9/2011 | Vasseur | ................. | H04L 45/124 709/238 |
| 2014/0122617 A1 * | 5/2014 | Ferguson | ............. | G06Q 10/107 709/206 |

(Continued)

*Primary Examiner* — Ryan Bertram
*Assistant Examiner* — Alex G Olson
(74) *Attorney, Agent, or Firm* — Pepper Hamilton LLP

(57) ABSTRACT

One or more techniques and/or systems are provided for implementing storage level access control for data grouping structures. For example, a storage level access guard may be defined for a data grouping structure (e.g., a Qtree, a portion of a volume, etc.) of a storage device. The storage level access guard may be defined at a storage level of the storage device such that clients and/or certain administrators such as domain administrators may be restricted from accessing and/or changing the storage level access guard, which may increase data security. A hidden and unmodifiable property may be applied to the storage level access guard, which may be stored in a directory associated with the data grouping structure so that a logical replication of the data grouping structure may also replicate the storage level access guard.

15 Claims, 9 Drawing Sheets

(56) References Cited

U.S. PATENT DOCUMENTS

| | | | |
|---|---|---|---|
| 2014/0122633 A1* | 5/2014 | Ferguson | G06Q 10/10 709/212 |
| 2014/0156981 A1* | 6/2014 | Hamid | G06F 21/575 713/2 |
| 2014/0157362 A1* | 6/2014 | Hamid | G06F 21/70 726/2 |
| 2014/0337585 A1* | 11/2014 | Grisenthwaite | G06F 12/1475 711/152 |
| 2015/0067637 A1* | 3/2015 | Charfi | G06F 8/24 717/104 |

* cited by examiner

STORAGE LEVEL ACCESS CONTROL FOR DATA GROUPING STRUCTURES

RELATED APPLICATIONS

This application claims the benefit of Indian Provisional Patent Application No. 5710/CHE/2014, filed on Nov. 13, 2014, titled "STORAGE LEVEL ACCESS CONTROL FOR DATA GROUPING STRUCTURES" which is incorporated herein by reference.

BACKGROUND

Many computing environments may implement various types of security to protect against malicious and/or undesirable access to data. In an example, a business may provide employees with work computing devices that may connect to a data storage network of the business. Access to a work computing device may be controlled by user login credentials of a user. Access to network resources (e.g., access to a particular file, directory, volume, storage aggregate, etc.) on the data storage network may be controlled based upon access rights specified for the user. For example, a user may be restricted from access a particular directory and/or file hosted on a volume of a data storage device within the data storage network.

A domain administrator (e.g., a user that maps to a root directory) may be capable of resetting security permissions in any way the domain administrator chooses. The domain administrator may have the ability to take ownership of a file and/or directory so that the domain administrator may remove permission constraints against them and potentially remove auditing settings. Thus, the domain administrator may unfortunately have unrestricted access to sensitive data within the data storage network (e.g., a client side administrator may have the ability to steal intellectual property from the business). It may be advantageous to employ an additional layer of security at a storage level where merely a storage administrator of the data storage network (e.g., a non-client side administrator) and/or storage operating systems and applications, but not the domain administrator or other client side users, have access to change storage level access security.

DETAILED DESCRIPTION

Figure 1:
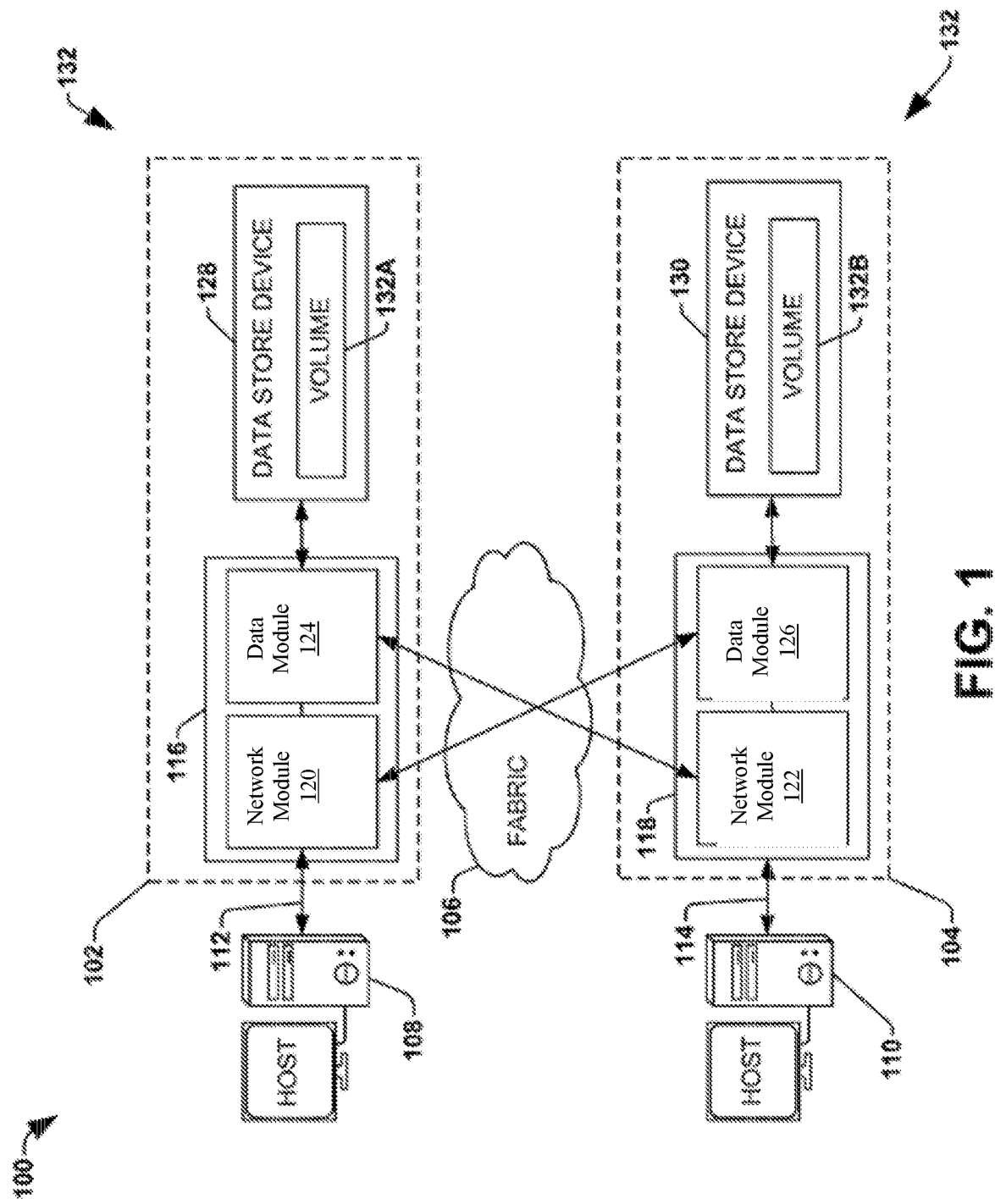
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for implementing storage level access control are provided. A data storage environment may comprise one or more storage devices accessible to clients over a data storage network (e.g., a storage node, such as a storage controller, may provide a client with access to data and/or directories on a storage device for which the client has permission to access). An additional layer of storage permissions and/or auditing for files and directories may be provided at a storage level. For example, a storage level access guard may be defined for a data grouping structure (e.g., a portion of a volume, such as a Qtree) of a storage device. The storage level access guard may specify data access permissions to file and/or directories and/or may specify auditing for such access. In this way, data access requests from clients may be evaluated utilizing the storage level access guard to determine whether to allow or deny the data access request at the storage level. A hidden and unmodifiable property may be applied to the storage level access guard so that the storage level access guard may be stored within a directory (e.g., a non-metadata directory) located within the volume or the Qtree without being accessible or vulnerable to users that are not storage administrators (e.g., a domain administrator may be blocked from accessible and changing permissions and/or auditing at the storage level). Because the storage level access guard may be stored within the Qtree, a logical replication command of the Qtree may also replicate the storage level access guard. Because the storage level access guard may be defined as default storage level access (e.g., defined for the volume or a default Qtree such as a Qtree ID 0), the storage level access guard may be applied to other data grouping structures, such as Qtrees of the volume, for which storage level access guards have not be defined. The data storage level access guard may be defined though a data storage operation system API call, a ZAPI command, a console, or other interface, as opposed to relying upon an external tool.

To provide context for implementing storage level access control for data grouping structures, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and/or data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that implementing storage level access control for data grouping structures may be implemented within the clustered network environment 100. For example, a storage level access component may be implemented for the node 116 and/or the node 118. The storage level access component may be configured to define storage level access guards for data grouping structures of data storage device 128 (e.g., a Qtree within volume 132A) associated with the node 116 and/or data storage device 130 (e.g., a Qtree within volume 132B) associated with the node 118. The storage level access component may be implemented at a storage level of the data storage device 128 and/or the data storage device 130.

Figure 2:
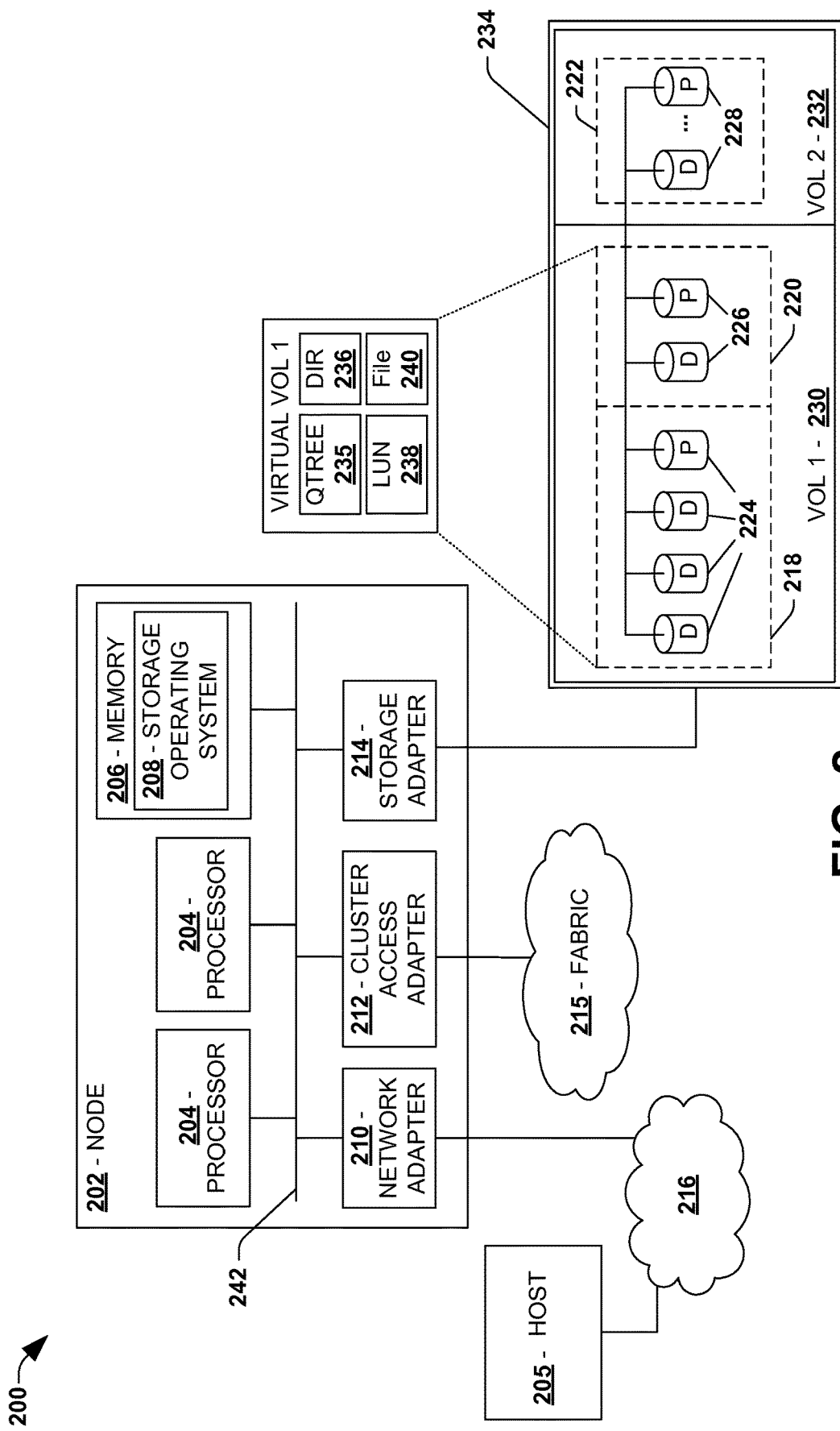
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that implementing storage level access control for data grouping structures may be implemented for the data storage system 200. For example, a storage level access component may be implemented for the node 202. The storage level access component may be configured to define storage level access guards for data grouping structures of the one or more data storage devices 234 (e.g., a Qtree 235). The storage level access component may be implemented at a storage level of the one or more data storage devices 234.

Figure 3:
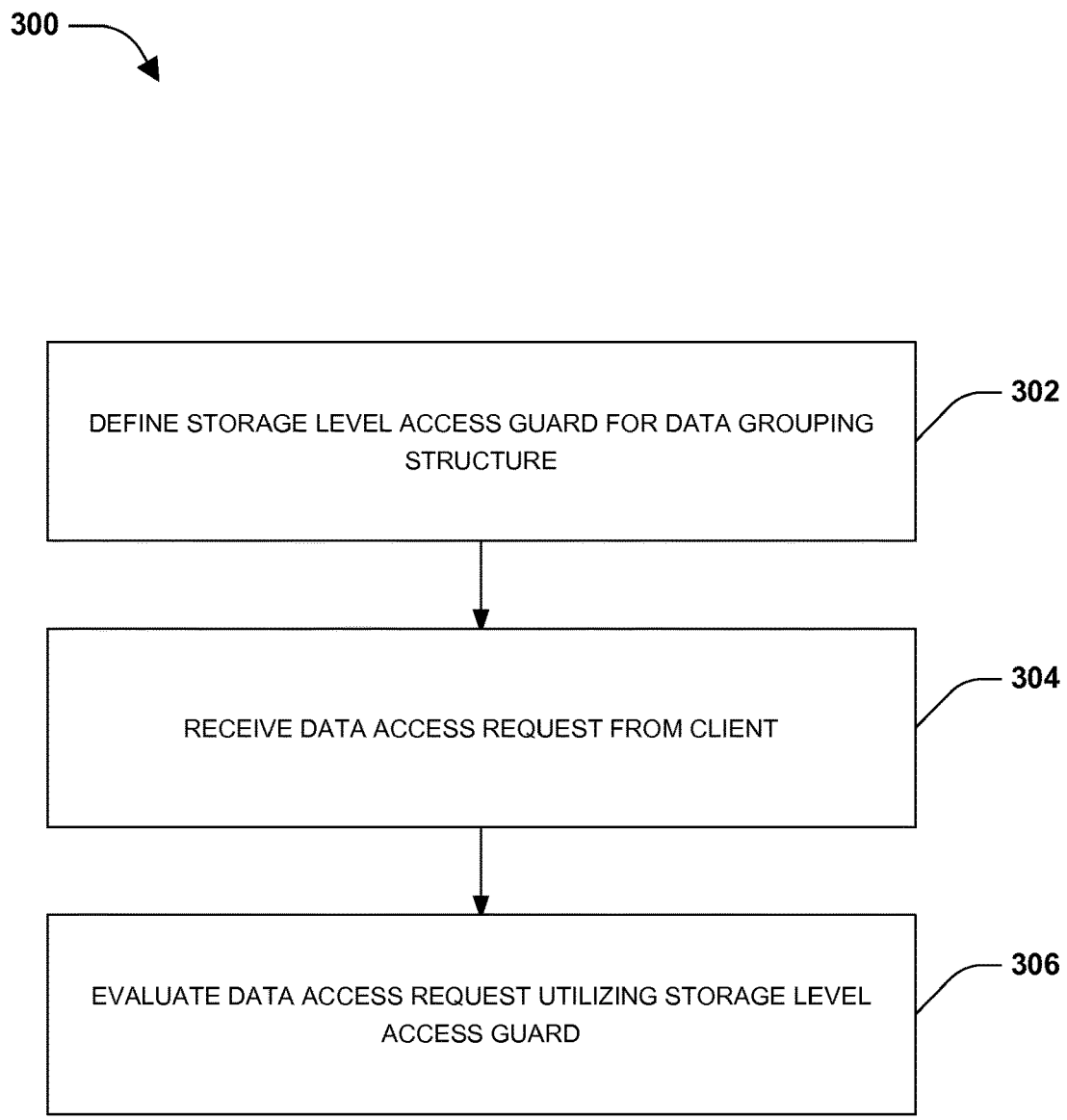
FIG. 3 is a flow chart illustrating an exemplary method of implementing storage level access control for data grouping structures.

One embodiment of implementing storage level access control for data grouping structures is illustrated by an exemplary method 300 of FIG. 3. At 302, a storage level access guard may be defined for a data grouping structure (e.g., a volume or a portion thereof such as a Qtree, a directory, or other data subset structure of the volume) of a storage device. The storage level access guard may be defined at a storage level of the storage device. In an example of defining the storage level access guard, a security interface may be exposed through a console (e.g., exposed to a storage administrator of a data storage network comprising the storage device). The storage level access guard may be received through the security interface. In another example of defining the storage level access guard, a data storage operating system API call, a ZAPI command, and/or any other command may be issued (e.g., sent to a storage node or storage controller that provides clients with data access to the storage device over the data storage network) to define the storage level access guard. A directory level storage access rule (e.g., specifying what clients, applications, and/or devices can access a directory and/or auditing rules for monitoring access to the directory) and/or a file level storage access rule (e.g., specifying what clients, applications, and/or devices can access a file and/or auditing rules for monitoring access to the file) may be specified for inclusion within the storage level access guard for enforcement at the storage level of the storage device.

In an example, the storage level access guard may be stored within a non-metadata directory of the storage device. For example, the storage level access guard may be stored within a directory of the data grouping structure. A hidden and unmodifiable property may be applied to the storage level access guard. The hidden and unmodifiable property may specify that a storage administrator (e.g., an administrator, of the data storage network, having permission to create, delete, and/or modify data storage objects, such as volumes, LUNs, etc.), but not a domain administrator (e.g., a user, such as a client side administrator, that maps to a root directory), is allowed to view and/or modify the storage level access guard. In this way, the domain administrator and/or other users may be restricted from accessing the storage level access guard (e.g., preventing a user from removing restrictions and/or auditing for data, otherwise protected by the storage level access guard, that the user may desire to misappropriate), which may improve security and protection of data provided by the storage level access guard.

At 304, a data access request may be received from a client (e.g., the data access request may request access to data stored within the volume, the data grouping structure, or a different data grouping structure within the volume). At 306, the data access request may be evaluated utilizing the storage level access guard to determine whether to allow or deny the data access request at the storage level. In an example of evaluating the data access request, responsive to the data access request passing an export level permission (e.g., checked against a network file system export level permission), the data access request may be evaluated using the storage level access guard at the storage level. Responsive to the data access request passing the storage level access guard, the data access request may be evaluated using a file level security check (e.g., checked against a file level permission) and/or an operating system permission check (e.g., checked against a UNIX permission). In an example of evaluating the data access request, responsive to the data access request passing a shared level security check (e.g., checked against a common internet file system share level permission), the data access request may be evaluated using the storage level access guard at the storage level. Responsive to the data access request passing the storage level access guard, the data access request may be evaluated using the file level security check (e.g., checked against the file level permission) and/or the operating system permission check (e.g., checked against the UNIX permission).

In an example, the data access request may be determined as being directed towards a second data grouping structure (e.g., within the volume) for which storage level access has not been defined. Responsive to determining that the storage level access guard is defined as default storage level access (e.g., the storage level access guard is defined for the volume or a default data grouping structure such as a Qtree ID 0), the data access request may be evaluated utilizing the default storage level access of the storage level access guard. In this way, default storage level access may be applied to data grouping structures for which storage level access guards have not been defined (e.g., the storage administrator may have forgotten to define a storage level access guard when creating a new Qtree).

In an example, the storage level access guard may be defined for a first storage access protocol (e.g., a network file system protocol, a common internet file system protocol, etc.). Responsive to determining that the data access request corresponds to a second storage access protocol (e.g., a network file system protocol, a common internet file system protocol, etc.) different than the first storage access protocol, the data access request may be mapped to the first storage access protocol to create a mapped data access request. The mapped data access request may be evaluated utilizing the storage level access guard.

In an example, a logical replication command (e.g., a mirroring command, a snapshot command, etc.) may be implemented for the data grouping structure. The logical replication command may replicate the data grouping structure and/or the storage level access guard (e.g., where the storage level access guard is stored within the directory of the data grouping structure). The logical replication command may be utilized to create a replication object comprising the data grouping structure and/or the storage level access guard. The replication object may be utilized to create a replicated data grouping structure and/or a replicated storage level access guard at a target location.

Figure 4:
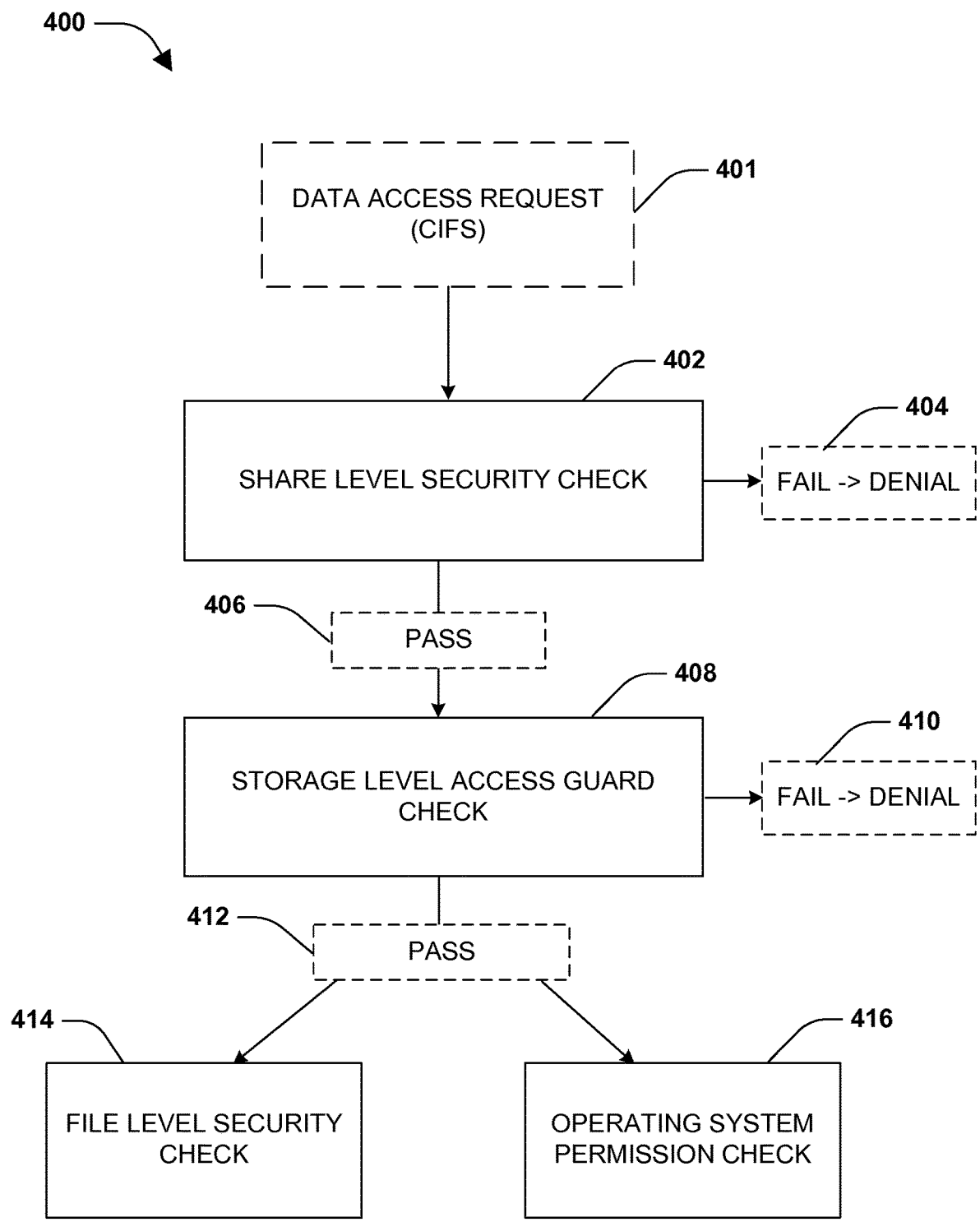
FIG. 4 is a flow chart illustrating an exemplary method of implementing storage level access control for data grouping structures, such as for a common internet file system (CIFS) client.

One embodiment of implementing storage level access control for data grouping structures is illustrated by an exemplary method 400 of FIG. 4. A data access request 401 may be received (e.g., through a common internet file system (CIFS) protocol). A share level security check 402 (e.g., a read permission associated with reading file names, reading subfolder names, reading file data, and/or executing files; a change permission associated with read permissions, adding files and subfolders, changing data in files, and/or deleting subfolders and files; full permission associated with read permissions, change permissions, and the ability to make changes to permissions; etc.) may be performed on the data access request 401. If the share level security check 402 fails, then the data access request 401 is denied 404.

If the data access request 401 passes 406 the share level security check 402 and the data access request 401 corresponds to CIFS (e.g., the data access request 401 was issued by a CIFS user or a non-CIFS user that is mapped to a CIFS user), then the data access request 401 is evaluated utilizing a storage level access guard by a storage level access guard check 408 performed at a storage level (e.g., the data access request 401 is checked against a directory level storage access rule and/or a file level storage access rule within the storage level access guard; auditing, specified by the storage level access guard, may be implemented; etc.). If the storage level access guard check 408 fails, then the data access request 401 is denied 410. If the data access request 401 passes 412 the storage level access guard check 408, then the data access request 401 is evaluated against a file level security check 414 (e.g., if the data access request 401 is targeting a NTFS volume or a mixed volume) or an operating system permission check 416 (e.g., check against UNIX permission) to determine whether to allow or deny the data access request 401.

Figure 5:
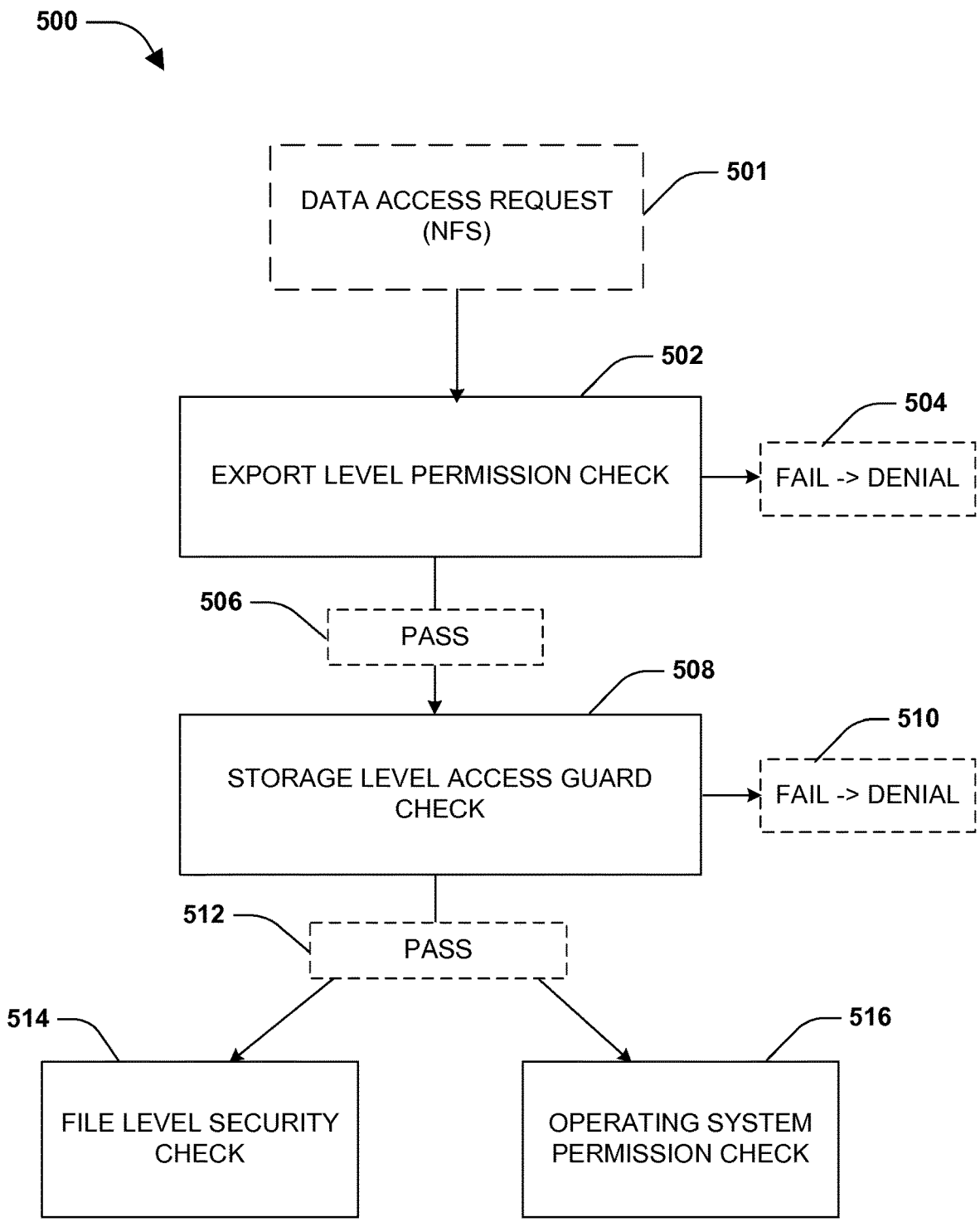
FIG. 5 is a flow chart illustrating an exemplary method of implementing storage level access control for data grouping structures, such as for a network file system (NFS) client.

One embodiment of implementing storage level access control for data grouping structures is illustrated by an exemplary method 500 of FIG. 5. A data access request 501 may be received (e.g., through a network file system (NFS) protocol). An export level permission check 502 (e.g., a read permission associated with reading file names, reading subfolder names, reading file data, and/or executing files; a change permission associated with read permissions, adding files and subfolders, changing data in files, and/or deleting subfolders and files; full permission associated with read permissions, change permissions, and the ability to make changes to permissions; etc.) such as a NFS export level permissions check may be performed on the data access request 501. If the export level permission check 502 fails, then the data access request 501 is denied 504.

If the data access request 501 passes 506 the export level permission check 502, then the data access request 501 is evaluated utilizing a storage level access guard by a storage level access guard check 508 performed at a storage level (e.g., the data access request 501 is checked against a directory level storage access rule and/or a file level storage access rule within the storage level access guard; auditing, specified by the storage level access guard, may be implemented; etc.). If the storage level access guard check 508 fails, then the data access request 501 is denied 510. If the data access request 501 passes 512 the storage level access guard check 508, then the data access request 501 is evaluated against a file level security check 514 (e.g., if the data access request 501 is targeting a NTFS volume or a mixed volume) or an operating system permission check 516 (e.g., check against UNIX permission) to determine whether to allow or deny the data access request 501.

Figure 6:
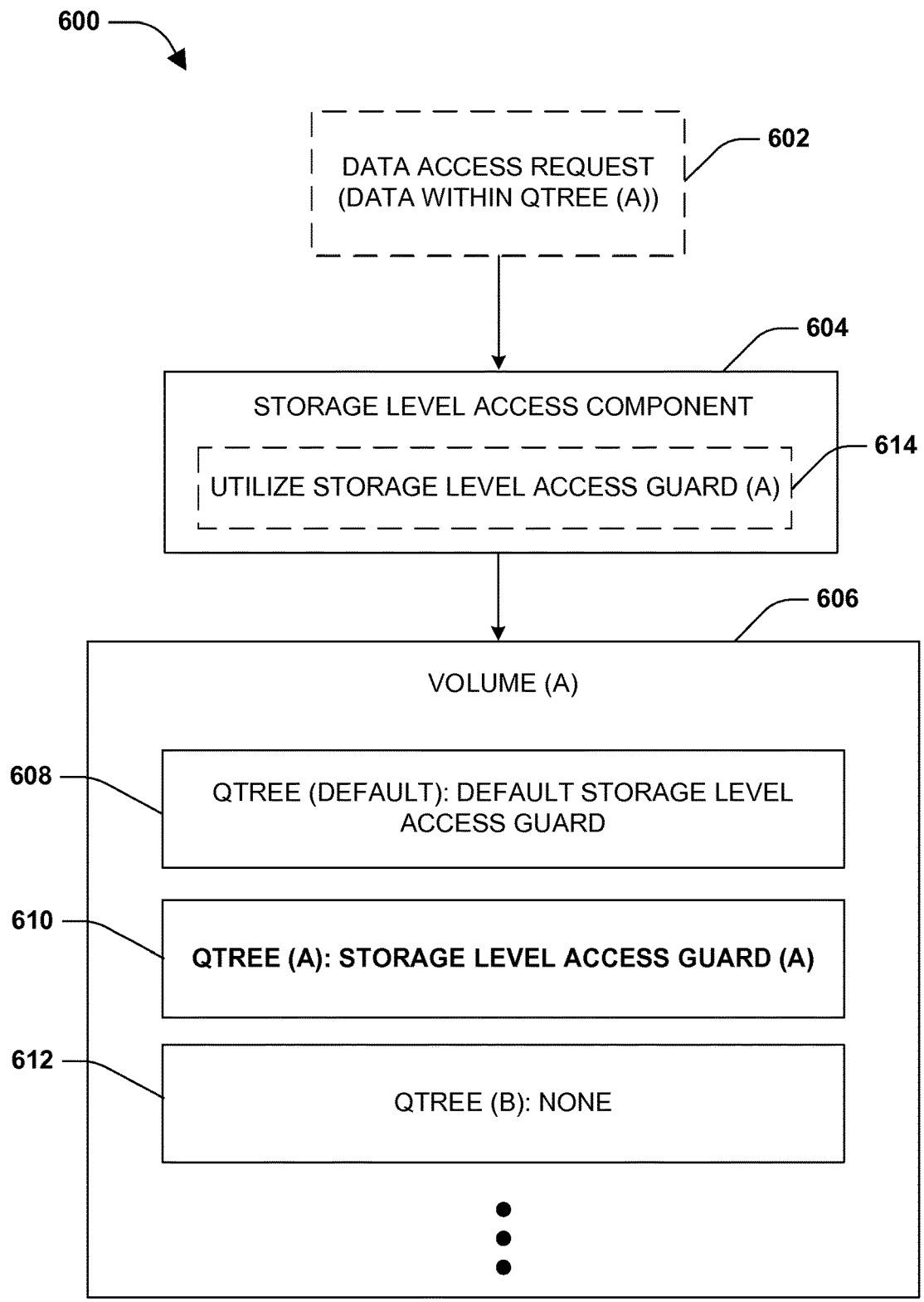
FIG. 6 is a component block diagram illustrating an exemplary system for implementing storage level access control for data grouping structures.

FIG. 6 illustrates an example of a system 600 for implementing storage level access control for data grouping structures. The system 600 comprises a storage level access component 604. The storage level access component 604 may receive a data access request 602 that is direct towards data stored within a Qtree (A) 610 of a volume (A) 606 within a storage device of a data storage network. The volume (A) 606 may comprise one or more data storage groupings, such as a default Qtree 608 (e.g., created as a default for the volume (A) 606), the Qtree (A) 610, a Qtree (B) 612, and/or other data storage groupings not illustrated. A default storage level access guard may be specified for the default Qtree 608. The default storage level access guard 608 may be applied to data access requests to the default Qtree 608 and/or other data storage groupings for which storage level access guards are not defined, such as the Qtree (B) 612.

The storage level access component 604 may evaluate the data access request 602 utilizing 614 a storage level access guard (A) specified for the Qtree (A) 610 (e.g., the data access request 602 is checked against a directory level storage access rule and/or a file level storage access rule within the storage level access guard (A); auditing, specified by the storage level access guard (A), may be implemented; etc.) because the data access request 602 targets data within the Qtree (A) 610. If the storage level access guard (A) indicates that the data access request 602 is not allowed, then the data access request 602 is denied at a storage level. If the storage level access guard (A) indicates that the data access request 602 is allow, then the data access request 602 is allowed at the storage level (e.g., the data access request 602 may be evaluated by security at other levels, such as a file level security check or an operating system permission check such as a check against UNIX permissions).

Figure 7:
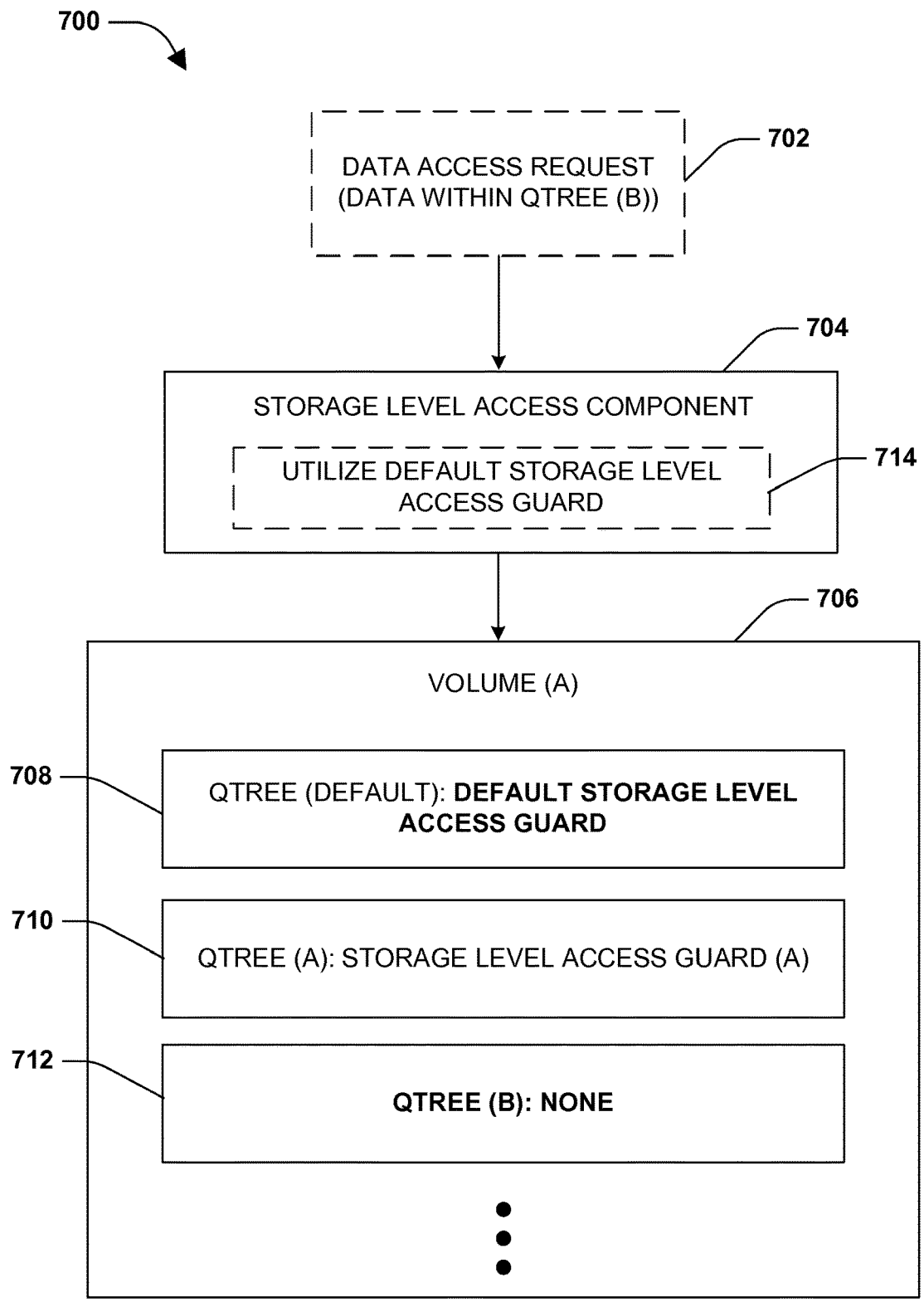
FIG. 7 is a component block diagram illustrating an exemplary system for implementing storage level access control for data grouping structures, where a default storage level access guard is utilized.

FIG. 7 illustrates an example of a system 700 for implementing storage level access control for data grouping structures. The system 700 comprises a storage level access component 704. The storage level access component 704 may receive a data access request 702 that is direct towards data stored within a Qtree (B) 712 of a volume (A) 706 within a storage device of a data storage network. The volume (A) 706 may comprise one or more data storage groupings, such as a default Qtree 708 (e.g., created as a default for the volume (A) 706), a Qtree (A) 710, the Qtree (B) 712, and/or other data storage groupings not illustrated. A default storage level access guard may be specified for the default Qtree 708. The default storage level access guard may be applied to data access requests to the default Qtree 708 and/or other data storage groupings for which storage level access guards are not defined, such as the Qtree (B) 712. A storage level access guard (A) may be defined for the Qtree (A) 710.

The storage level access component 704 may evaluate the data access request 702 utilizing 714 the default storage level access guard of the default Qtree 708 (e.g., the data access request 702 is checked against a directory level storage access rule and/or a file level storage access rule within the default storage level access guard; auditing, specified by the default storage level access guard, may be implemented; etc.) because no storage level access guard is defined for the Qtree (B) 712 that is targeted by the data access request 702. If the default storage level access guard 708 indicates that the data access request 702 is not allowed, then the data access request 702 is denied at a storage level. If the default storage level access guard 708 indicates that the data access request 702 is allow, then the data access request 702 is allowed at the storage level (e.g., the data access request 702 may be evaluated by security at other levels, such as a file level security check or an operating system permission check such as a check against UNIX permissions).

Figure 8:
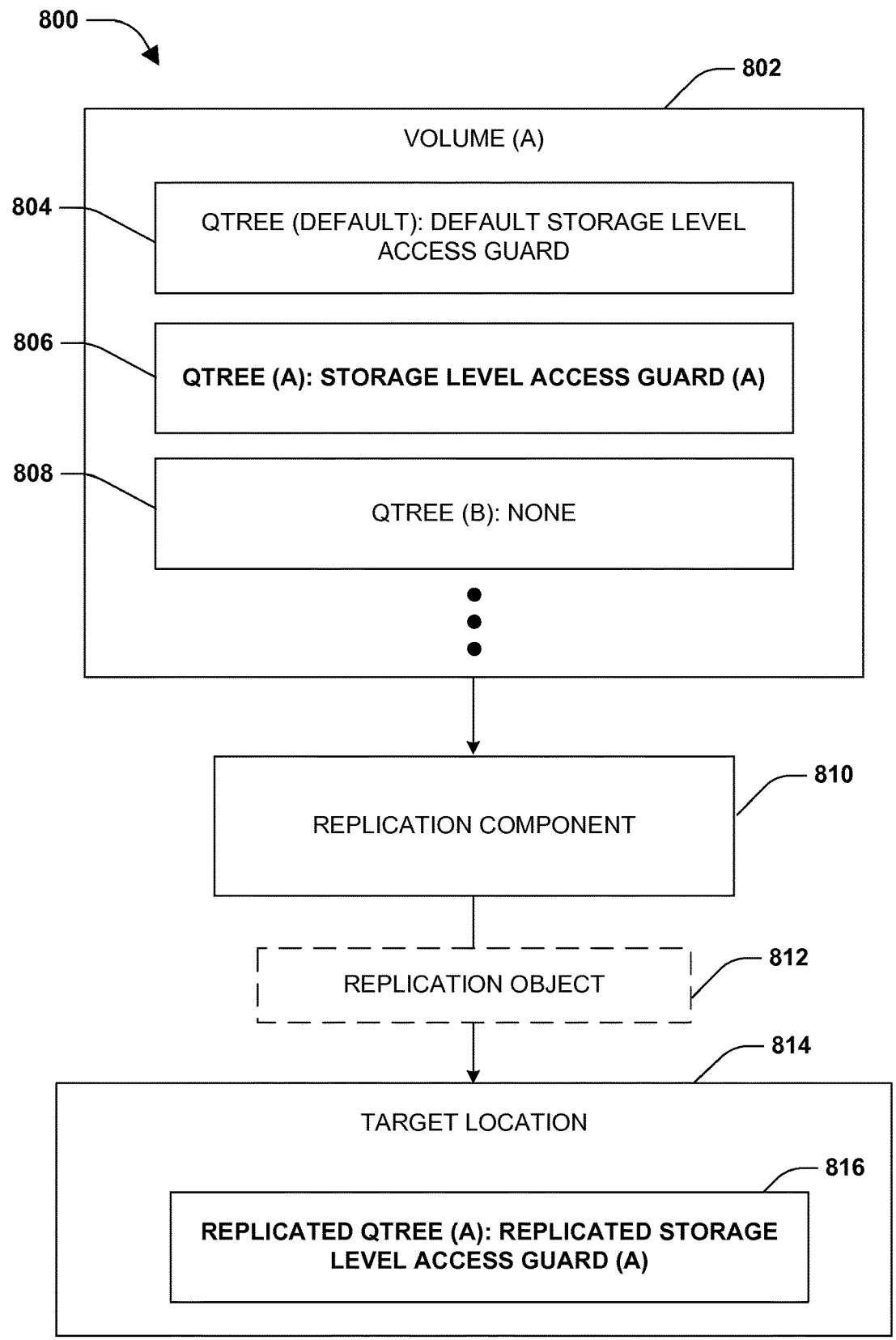
FIG. 8 is a component block diagram illustrating an exemplary system for replicating data grouping structures and/or storage level access guards.

FIG. 8 illustrates an example of a system 800 for replicating data grouping structures and/or storage level access guards. The system 800 may comprise a replication component 810. The replication component 810 is associated with a volume (A) 802 of a storage device of a data storage network. The volume (A) 802 may comprise one or more data storage groupings, such as a default Qtree 804 (e.g., created as a default for the volume (A) 802), a Qtree (A) 806, a Qtree (B) 806, and/or other data storage groupings not illustrated. The replication component 810 may implement a logical replication command (e.g., a mirroring command, a snapshot command, etc.) specifying that Qtree (A) 806 is to be replicated to a target location 814. The replication component 810 may implement the logical replication command to create a replication object 812 for the Qtree (A) 806 and a storage level access guard (A) defined for the Qtree (A) 806. Because the storage level access guard (A) may be stored within a directory of the Qtree (A) 806, the storage level access guard (A) may be replicated into the replication object 812 along with a replication of the Qtree (A) 806. The replication object 812 may be utilized to create a replicated Qtree (A) 816, having a replicated storage level access guard (A), at the target location 814.

Figure 9:
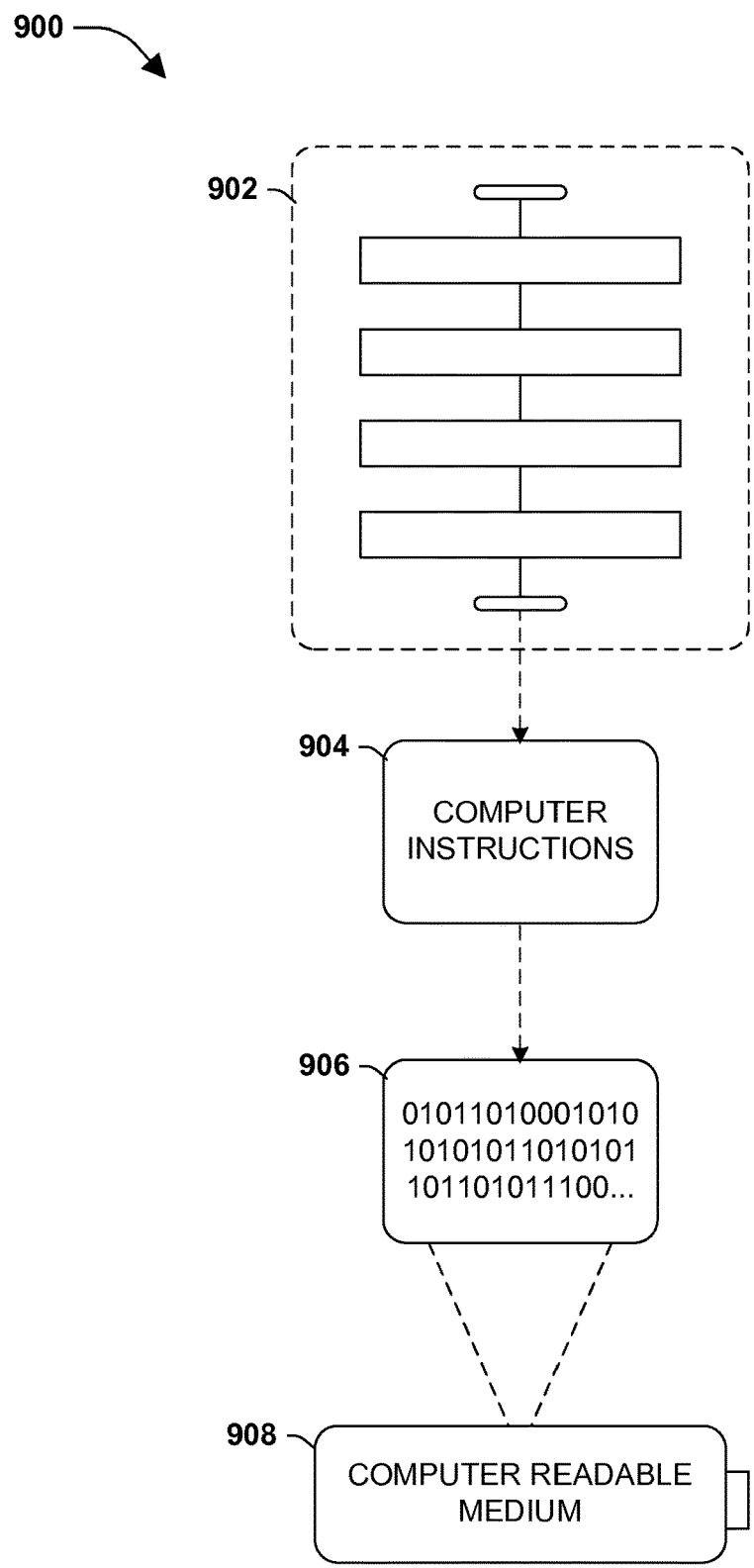
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 400 of FIG. 4, and/or at least some of the exemplary method 500 of FIG. 5, for example. In some embodiments, the processor-executable instructions 904 are configured to implement a system, such as at least some of the exemplary system 600 of FIG. 6, at least some of the exemplary system 700 of FIG. 7, and/or at least some of the exemplary system 800 of FIG. 8, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   defining, by a computing device, an access guard for a data grouping structure hosted on one or more storage devices, wherein the access guard is stored in a directory of the data grouping structure;
   applying, by the computing device, a property to the access guard specifying that access to the access guard is restricted;

evaluating, by the computing device, a received data access request utilizing the access guard, when the data access request is directed towards another data grouping structure that lacks definition of storage level access restrictions, wherein the another data grouping structure is within a same volume as the data grouping structure; and evaluating, by the computing device, the received data access request utilizing a file level security check to determine when to allow the data access request, when the evaluation utilizing the access guard has passed.

2. The method of claim 1, comprising utilizing, by the computing device, a logical replication command to create a replication object and the replication object to create a replicated data grouping structure and a replicated access guard at a target location.

3. The method of claim 1, wherein the data grouping structure for which the access guard is defined comprises a Qtree within a volume of the one or more storage devices.

4. The method of claim 1, further comprising mapping, by the computing device, the data access request to a first storage access protocol for which the access guard is defined to create a mapped data access request, when the data access request corresponds to a second storage access protocol.

5. The method of claim 1, further comprising evaluating, by the computing device, the data access request using an operating system permission check, when a check based on the access guard has passed.

6. A computing device, comprising:
a memory containing a machine readable medium comprising machine executable code having stored thereon instructions for implementing storage level access control for data grouping structures; and
a processor coupled to the memory, the processor configured to execute the machine executable code to:
define an access guard for a data grouping structure hosted on one or more storage devices, wherein the access guard is stored in a directory of the data grouping structure;
apply a property to the access guard specifying that access to the access guard is restricted; and
evaluate a received data access request utilizing the access guard, when the data access request is directed towards another data grouping structure that lacks definition of storage level access restrictions, wherein the another data grouping structure is within a same volume as the data grouping structure; and
evaluate the received data access request utilizing a file level security check to determine when to allow the data access request, when the evaluation utilizing the access guard has passed.

7. The computing device of claim 6, wherein the processor is further configured to execute the machine executable code to utilize a logical replication command to create a replication object and the replication object to create a replicated data grouping structure and a replicated access guard at a target location.

8. The computing device of claim 6, wherein the data grouping structure for which the access guard is defined comprises a Qtree within a volume of the one or more storage devices.

9. The computing device of claim 6, wherein the processor is further configured to execute the machine executable code to map the data access request to a first storage access protocol for which the access guard is defined to create a mapped data access request, when the data access request corresponds to a second storage access protocol.

10. The computing device of claim 6, wherein the processor is further configured to execute the machine executable code to evaluate the data access request using an operating system permission check, when a check based on the access guard has passed.

11. A non-transitory computer readable medium having stored thereon instructions for implementing storage level access control for data grouping structures that, when executed by at least one machine, cause the machine to:
define an access guard for a data grouping structure hosted on one or more storage devices, wherein the access guard is stored in a directory of the data grouping structure;
apply a property to the access guard specifying that access to the access guard is restricted; and
evaluate a received data access request utilizing the access guard, when the data access request is directed towards another data grouping structure that lacks definition of storage level access restrictions, wherein the another data grouping structure is within a same volume as the data grouping structure; and
evaluate the received data access request utilizing a file level security check to determine when to allow the data access request, when the evaluation utilizing the access guard has passed.

12. The non-transitory computer readable medium as set forth in claim 11, wherein the machine executable code, when executed by the machine, further causes the machine to utilize a logical replication command to create a replication object and the replication object to create a replicated data grouping structure and a replicated access guard at a target location.

13. The non-transitory computer readable medium as set forth in claim 11, wherein the data grouping structure for which the access guard is defined comprises a Qtree within a volume of the one or more storage devices.

14. The non-transitory computer readable medium as set forth in claim 11, wherein the machine executable code, when executed by the machine, further causes the machine to map the data access request to a first storage access protocol for which the access guard is defined to create a mapped data access request, when the data access request corresponds to a second storage access protocol.

15. The non-transitory computer readable medium as set forth in claim 11, wherein the machine executable code, when executed by the machine, further causes the machine to evaluate the data access request using an operating system permission check, when a check based on the access guard has passed.

* * * * *